United States Patent
Mousavian et al.

(10) Patent No.: US 10,304,191 B1
(45) Date of Patent: May 28, 2019

(54) THREE DIMENSIONAL BOUNDING BOX ESTIMATION FROM TWO DIMENSIONAL IMAGES

(71) Applicant: Zoox, Inc., Menlo Park, CA (US)

(72) Inventors: Arsalan Mousavian, Fairfax, VA (US); John Patrick Flynn, Los Angeles, CA (US); Dragomir Dimitrov Anguelov, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 58 days.

(21) Appl. No.: 15/290,949

(22) Filed: Oct. 11, 2016

(51) Int. Cl.
*G06K 9/00* (2006.01)
*G06T 7/11* (2017.01)
*G06T 11/60* (2006.01)
*G06T 7/60* (2017.01)

(52) U.S. Cl.
CPC ............ *G06T 7/11* (2017.01); *G06K 9/00624* (2013.01); *G06T 7/60* (2013.01); *G06T 11/60* (2013.01); *G06T 2207/20081* (2013.01); *G06T 2207/20084* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 9,373,057 B1 * | 6/2016 | Erhan | G06K 9/6202 |
| 2016/0174902 A1 * | 6/2016 | Georgescu | G06T 7/73 |
| | | | 600/408 |
| 2017/0124415 A1 * | 5/2017 | Choi | G06N 3/08 |
| 2017/0200061 A1 * | 7/2017 | Julian | G06K 9/6202 |
| 2017/0228940 A1 * | 8/2017 | Kutliroff | G06T 19/20 |
| 2017/0287170 A1 * | 10/2017 | Perona | G06T 7/97 |
| 2017/0337470 A1 * | 11/2017 | DeTone | G06T 7/12 |
| 2017/0372480 A1 * | 12/2017 | Anand | G06F 17/5009 |

OTHER PUBLICATIONS

Cai et al., "A Unified Multi-scale Deep Convolutional Neural Network for Fast Object Detection," In ECCV, Jul. 25, 2016, 16 pages.
Chen et al., "3D Object Proposals for Accurate Object Class Detection," In NIPS, Dec. 7-12, 2015, 9 pages.
(Continued)

Primary Examiner — Wei Wen Yang
(74) Attorney, Agent, or Firm — Lee & Hayes, P.C.

(57) ABSTRACT

A three dimensional bounding box is determined from a two dimensional image. A two dimensional bounding box is calculated based on a detected object within the image. A three dimensional bounding box is parameterized as having a yaw angle, dimensions, and a position. The yaw angle is defined as the angle between a ray passing through a center of the two dimensional bounding box and an orientation of the three dimensional bounding box. The yaw angle and dimensions are determined by passing the portion of the image within the two dimensional bounding box through a trained convolutional neural network. The three dimensional bounding box is then positioned such that the projection of the three dimensional bounding box into the image aligns with the two dimensional bounding box previously detected. Characteristics of the three dimensional bounding box are then communicated to an autonomous system for collision and obstacle avoidance.

20 Claims, 6 Drawing Sheets

(56) References Cited

OTHER PUBLICATIONS

Chen et al., "Monocular 3D Object Detection for Autonomous Driving," In IEEE CVPR, Jun. 27-29, 2016, 10 pages.
Ferrari et al., "Simultaneous Object Recognition and Segmentation from Single or Multiple Model Views," International Journal of Computer Vision (IJCV), 62(2):159-188, May 2006, 26 pages.
Geiger et al., "Are we ready for Autonomous Driving? The KITTI Vision Benchmark Suite," In CVPR, Jun. 16-21, 2012, 8 pages.
Girshick et al., "Rich feature hierarchies for accurate object detection and semantic segmentation," In CVPR, Jun. 7-12, 2015, 21 pages.
Lepetit et al., "EPnP: An Accurate O(n) Solution to the PnP Problem," International Journal of Computer Vision (IJCV), Sep. 2009, 12 pages.
Liu, "SSD: Single Shot MultiMBox Detector," In ECCV, Oct. 8-16, 2016, 17 pages.
Mottaghi et al., "A Coarse-to-Fine Model for 3D Pose Estimation and Sub-Category Recognition," In Proceedings of the IEEE International Conference on Computer Vision and Pattern Recognition, Jun. 2015, 1 page.
Pepik et al., "Teaching 3D Geometry to Deformable Part Models," In CVPR, Jun. 16-21, 2012, 8 pages.
Poirson et al., "Fast Single Shot Detection and Pose Estimation," In 3DV, Oct. 25-28, 2016, 9 pages.
Redmon et al., "You Only Look Once: Unified, Real-Time Object Detection," In CVPR, Jun. 26-Jul. 1, 2016. 10 pages.
Rothganger et al., "3D Object Modeling and Recognition Using Local Affine-Invariant Image Descriptors and Multi-View Spatial Constraints," IJCV, 66(3):231-259, 2006, 47 pages.
Simonyan et al., "Very Deep Convolutional Networks for Large-Scale Image Recognition," CoRR, abs/1409.1556, 2014, 14 pages.
Su, et al., "Render for CNN: Viewpoint Estimation in Images Using CNNs Trained with Rendered 3D Model Views," In the IEEE International Conference on Computer Vision (ICCV), Dec. 2015, 9 pages.
Tulsiani et al., "Viewpoints and Keypoints," In CVPR, 2015, 10 pages.
Xiang et al., "Beyond Pascal: A Benchmark for 3D Object Detection in the Wild," In WACV, 2014, 8 pages.
Xiang et al., "Data-Driven 3D Voxel Patterns for Object Categorry Recognition," In Proceedings of the International Conference on Learning Representation, 2015,and In Proceedings of the IEEE International Conference on Computer Vision and Pattern Recognition, 2015, 9 pages.
Xiang et al., "Subcategory-aware Convolutional Neural Networks for Object Proposals and Detection," In arXiv:1604.04693. Apr. 16, 2016, 16 pages.
Zhang et al., "Colorful Image Colorization," In ECCV, Oct. 8-16, 2016, 17 pages.
Zhou et al., "Object Detectors Emerge in Deep Scene CNNs," In Proceedings of the International Conference on Learning Representation, May 7-9, 2015, 12 pages.
Zhu et al., "Single Image 3D Object Detection and Pose Estimation for Grasping," In IEEE ICRA, May 2014, 8 pages.

* cited by examiner

THREE DIMENSIONAL BOUNDING BOX ESTIMATION FROM TWO DIMENSIONAL IMAGES

BACKGROUND OF THE INVENTION

Multiple applications require information about three dimensional objects present in an environment. For example, various autonomous systems, such as autonomous vehicles and autonomous drones, utilize three dimensional data of objects for collision and obstacle avoidance. In order to effectively navigate a three dimensional environment, such autonomous systems need information about the obstacle size and location. Additionally, these systems require estimates of how such an object interacts with the environment. One such representation of a three dimensional object is a three dimensional bounding box. A three dimensional bounding box is a simple representation of a three dimensional object having a position, orientation, length, width, and height.

Though various sensors, such as RADAR and LIDAR, can provide three dimensional information of objects in an environment, they are much more expensive than simple camera systems.

DETAILED DESCRIPTION

Figure 1:
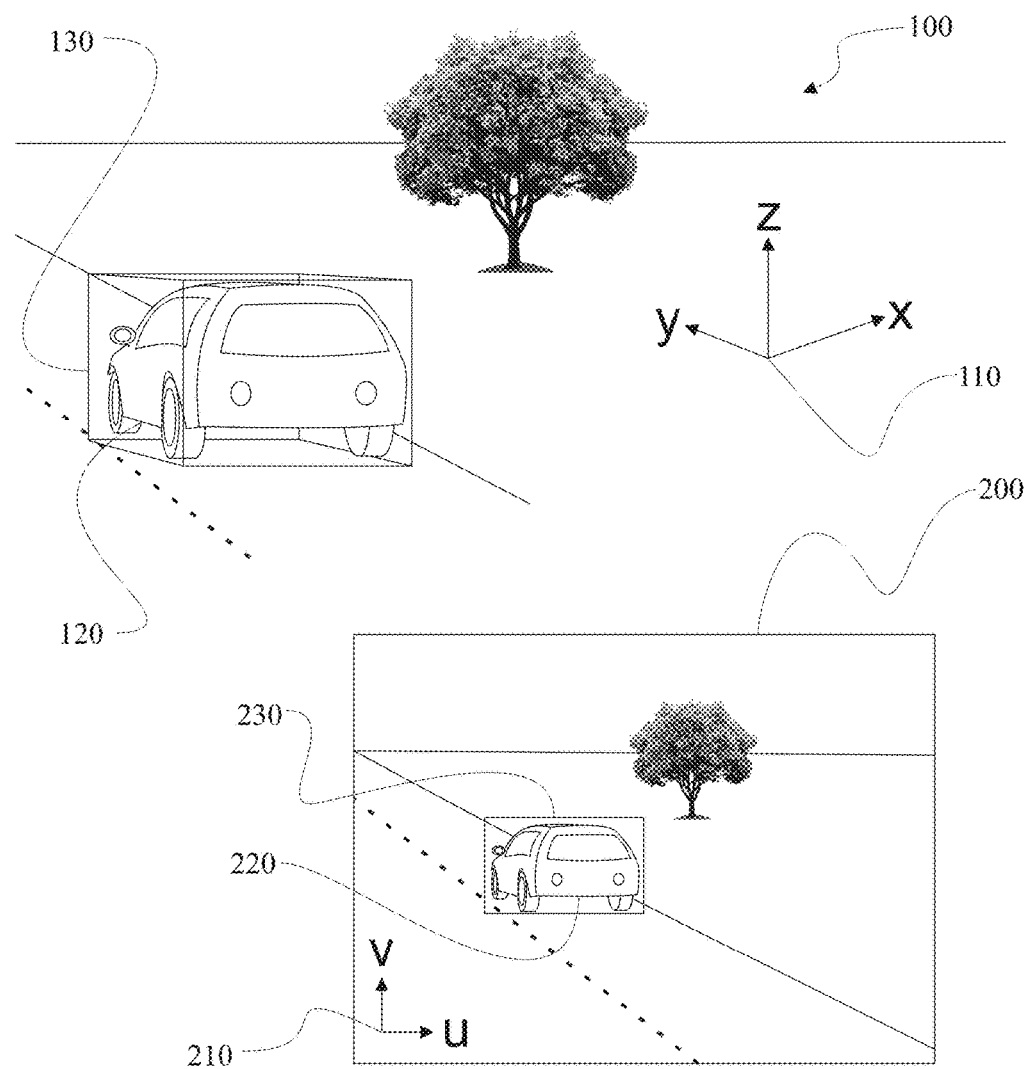
FIG. 1 illustrates an example of an environment with an image and a three dimensional bounding box around an object.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The following detailed description is directed to technologies for estimating three dimensional bounding boxes from images. There are various applications which require spatial information of objects present within an environment. As a brief example, many autonomous systems, such as semi- and fully autonomous vehicles, autonomous drones, and the like, require position, orientation, and dimensions of objects in an environment in order to perform tracking, navigation, and collision avoidance.

Traditional systems which provide three dimensional information, such as LIDAR and RADAR, can provide information about 3D objects in an environment, but are expensive and require significant computational resources. Generally, LIDAR sensors can generate a large amount of range measurements within a short amount of time (e.g., 1000-100000 range measurements every 0.1 seconds). Recording these points requires large amounts of storage. Additionally, the large number of points returned from such a system must still be processed to segment objects in the environment. Segmenting objects out of such a large number of points is extremely computational expensive. Furthermore, these LIDAR systems are also limited by additional environmental constraints, such as weather.

Estimates of three dimensional information of objects in an environment are provided from a simple image capture device, as will be described in detail below. Such a method relies on commercially available image capture devices, significantly reducing the cost and computational requirements to provide the three dimensional information of objects in an environment.

One three dimensional representation of an object is a three dimensional bounding box. A three dimensional bounding box is a minimum volume cuboid which encompasses an object. The three dimensional bounding box provides information about spatial location, orientation, as well as size for the object it contains. This information provided to, for example, an autonomous system can be used for tracking, navigation, and collision avoidance.

Once image data is received from an image capture device, various algorithms (such as Single Shot Detector Multibox, Fast-CNN, Faster-R CNN, overfeat, region based fully-connected networks, etc) are applied to identify objects in the image, along with their two dimensional bounding boxes. These algorithms may be selected to only identify certain object classes. For example, the algorithm may detect only cars, pedestrians, animals, or any combination thereof, though detection of any number of object classes is contemplated. A machine learning algorithm is then applied to image data located within the two dimensional bounding box to estimate various parameters for a three dimensional bounding box associated with the object. An example machine learning algorithm used to recover the parameters is a convolutional neural network (CNN).

In order for further reduce the computational complexity required, the bounding box is reparameterized. In one embodiment, instead of estimating a full orientation of the three dimensional bounding box, the three dimensional bounding box is described by an angle defined as the angle between a ray passing from the center of the image capture device through the center of the two dimensional bounding box and a direction of the three dimensional bounding box. Such an angle is referred to as the yaw angle. The CNN is trained, as will be discussed in detail below, to output dimensions of a bounding box for the object, as well as the yaw angle. To further reduce computational complexity required, the yaw angle may be estimated by a combination of a course estimation (i.e. determining that the yaw angle is within a bin, each bin representing a broad range of angles) and/or a fine estimate (i.e. determining an offset from the center of each bin). In another embodiment, the three dimension bounding box is described by the yaw angle, as above, as well as a roll angle and/or a pitch angle. A CNN is then trained to output the yaw angle, dimensions, and roll angle and/or pitch angle.

A location and orientation for the three dimensional bounding box can be calculated based on the dimensions and yaw angle output from the CNN, as well as the location and dimensions of the two dimensional bounding box. Once the position and orientation for the three dimensional bounding box is calculated, the three dimensional bounding box information may be relayed to additional systems. For example, such information may be relayed to an autonomous system, such as an autonomous drone, a semi-, or fully autonomous vehicle, for tracking the object, navigation, and/or collision avoidance. More details are provided below with reference to FIGS. 1-7.

Turning to FIG. 1, various objects may be present in an environment 100. For exemplary purposes, one such object in the environment 100 is a vehicle 120. The environment 100 is associated with a coordinate system 110. The coordinate system 110 may be either global or local. In a global coordinate system, any point expressed in the coordinate system 110 is an absolute coordinate. Alternatively, in a local coordinate system points are expressed relative to an arbitrarily defined origin, which may move in a global coordinate system.

An image 200 of the environment 100 may be captured by at least one image capture device (not shown in this figure), the image 200 comprising image data. For exemplary purposes, the image capture device is a camera. However, other image capture devices are contemplated, such as red, green, blue, depth (RGBD) cameras, stereo cameras, and the like. Each pixel in the image 200 is represented by an image coordinate system 210 as a two dimensional coordinate. Upon capturing the image 200, the vehicle 120 is represented as a vehicle image 220 in the image 200. As described above, once the image 200 is captured, any number of algorithms may be run to identify objects in the image and create two dimensional bounding boxes around the identified objects. As illustrated in FIG. 1, such an algorithm has detected an object, here vehicle image 220, having a corresponding two dimensional bounding box 230. The two dimensional bounding box 230 is rectangular and dimensioned and positioned so as to completely encompass the vehicle image 220 within image 200. In an alternate embodiment, the image 200 is captured by at least one stereo camera, RGBD camera, or depth camera. Use of multiple cameras allows for recovery of depth information through the use of multiple view geometry. In that embodiment, depth information from stereo or RGBD cameras is used to aid detection of objects in image 200 for segmenting the image 200 and creating the two dimensional bounding box 230.

Though a two dimensional bounding box 230 can be detected in image 200, the two dimensional bounding box 230 does not provide enough information for an autonomous system to navigate. Such an autonomous system requires additional information, as would be provided by a corresponding three dimensional bounding box. An exemplary three dimensional bounding box 130 is shown. The three dimensional bounding box 130 is dimensioned, positioned, and oriented so as to completely encompass the vehicle 120 such that the three dimensional bounding box 130 has a minimal volume. A position of the three dimensional bounding box 130 is defined relative to the coordinate system 110. Though a projection of the three dimensional bounding box 130 will align with the two dimensional bounding box 230, there is not enough information to recover the three dimensional bounding box 130 from the two dimensional bounding box 230 alone. As will be discussed in further detail below, the three dimensional bounding 130 can be estimated based on the two dimensional bounding box 230, in addition to image data contained within.

Parameterization

A three dimensional bounding box is defined by its dimensions (length, width, height), as well as a three dimensional position and orientation (x, y, z, roll, pitch, yaw). Therefore, to fully express a three dimensional bounding box requires nine total parameters. To reduce the complexity of solving for the full position, orientation, and dimensions of such a three dimensional bounding box, the problem may be reparameterized.

Figure 2:
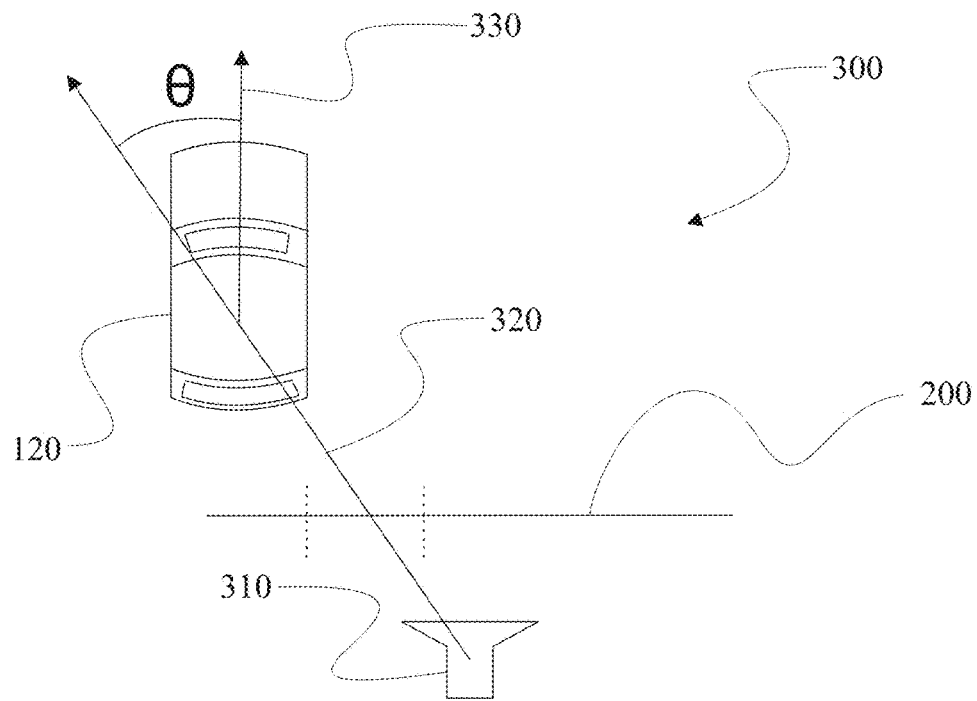
FIG. 2 is a representation of an example parameterization for determining a three dimensional bounding box from a two dimensional image.

FIG. 2 illustrates an exemplary reparameterization technique. As illustrated, image 200 is captured by an image capture device 310. Each pixel in the image 200 is associated with a ray which emanates from the center of image capture device 310 and passes through the pixel. Each ray extends in a direction of an unprojection for each corresponding pixel. Such an unprojection operation can be defined as:

$$\vec{r} = K^{-1} \begin{pmatrix} u_c \\ v_c \\ 1 \end{pmatrix},$$

where K is a calibration matrix for the image capture device 310. Here, a vector along the ray, $\vec{r}$, is relative to the coordinate frame of the image capture device. In one embodiment, to better model any distortions in the image capture device, the image is first rectified before unprojecting.

The two dimensional bounding box 230 lies in the plane of the image 200 and is centered at a pixel coordinate ($u_c$, $v_c$). The location of the two dimensional bounding box 230 is illustrated in FIG. 2 as a pair of dashed lines which indicate the location within the image 200. The two dimensional bounding box 230 is formed around an object, such as vehicle 120, detected in image 200. A center ray 320 is the ray associated with the pixel located at the center of the two dimensional bounding box in the image 200. The object, here vehicle 120, is also associated with an orientation 330. For exemplary purposes the orientation 330 is a direction of travel for the vehicle 120. In an alternate embodiment, the orientation 330 is a direction parallel to one of the dimensions of the three dimensional bounding box associated with the object. A yaw angle, θ, is defined as an angle formed between the center ray 320 and the orientation 330. In one embodiment, a dimension associated with a height of the three dimensional bounding box is aligned with a gravitational vector. In an alternative embodiment, the three dimensional bounding box is oriented to be parallel to a plane containing the image capture device. By parameterizing the three dimensional bounding box in this manner, the number of variables required to fully describe the three dimensional bounding box is reduced from nine (length, width, height, and pose) to seven (length, width, height, position, and yaw angle). By reducing the number of variables to be solved for, computational time and resources needed for estimation are decreased. In fact, estimation of the three dimensional bounding box may not be computationally possible if all nine parameters are used. In yet another embodiment, the three dimensional bounding box is also represented by a roll angle and/or a pitch angle.

Figure 3:
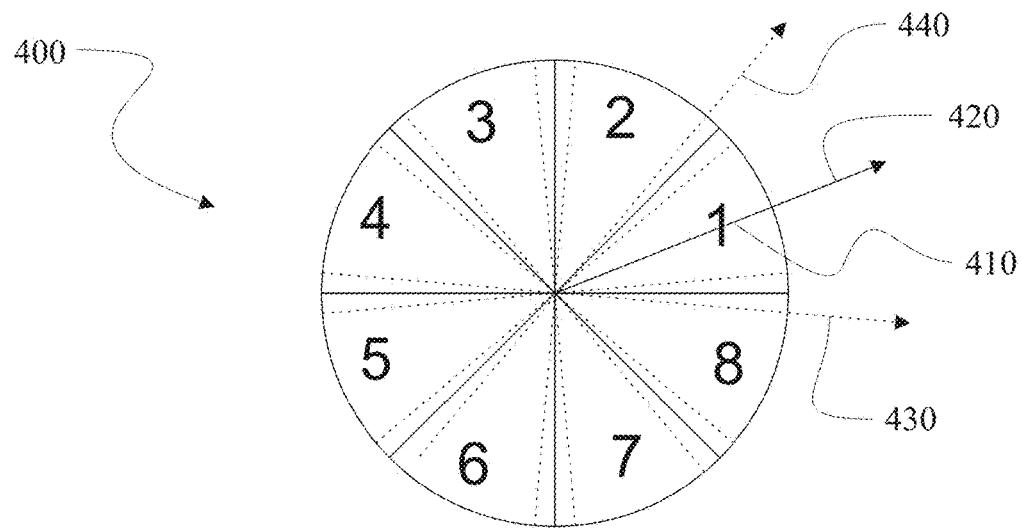
FIG. 3 illustrates an example discretization of yaw angle into multiple bins.

FIG. 3 illustrates an example a yaw angle discretization 400. Course estimation of the yaw angle is accomplished by dividing all possible yaw angles (i.e., 0 to $2\pi$) into a discrete number of ranges. As illustrated, discrete bins 410 are associated with various ranges of possible values for the yaw angle, each bin 410 having a center angle 420 which bisects the bin 410. A confidence value is assigned to each bin 410 which represents the confidence that the yaw angle of the three dimensional bounding box is within that particular bin 410. For exemplary purposes, the number of bins 410 illustrated is 8, however any other number of bins 410 is contemplated. Though any number of bins 410 may be used, in some examples the number of bins is at least two and less than 16. Initially, each bin 410 spans $$\frac{2\pi}{n}$$

radians, where n is the number of bins 410 chosen. For illustrative purposes, a first bin 410 spans 0 to 0.785 radians, having a center angle 420 of 0.393 radians, a second bin 410 spans 0.785 to 1.57 radians, having a center angle 420 of 1.178 radians, and so on. In this manner, the yaw angle is defined as $\theta=c_b+\theta_b$, where $c_b$ is the center angle 420 of the bin 410 with the highest confidence and $\theta_b$ is the angular distance from that center angle 420 to the yaw angle. If there is no single bin with a highest confidence (i.e. multiple bins have the same confidence which is greater than the remaining bins), any of those bins with the highest confidence is selected.

In order to increase robustness for those yaw angles that may lie on a boundary of two bins, each bin 410 may be extended to overlap neighboring bins 410, such that each bin 410 extends from a minimum angle 430 to a maximum angle 440. In some examples, the span of each bin 410 may be extended by between 10% to 25% of an original angular span. In an alternate embodiment, each bin is extended by a fixed amount, such as 0.05 radians.

Training the Convolutional Neural Network

Multiple machine learning techniques are used to predict outputs based on training. One such machine learning technique to extract data from an image is a convolutional neural network, or CNN. CNNs are biologically inspired algorithms which pass input data through a series of layers to produce an output. To produce a valid output, a CNN must first be trained. Training is accomplished by inputting a dataset into the CNN, the dataset being associated with expected output, or ground truth, values. An appropriate dataset to train the CNN, therefore, includes images of objects having ground truth values for yaw angle, length, width, and height of associated three dimensional bounding boxes. Training can be performed using offline and/or online data. An architecture for a CNN which produces a yaw angle, a length, a width, and a height will be discussed in detail below.

Increasing the Amount of Training Data

As above, the accuracy of a CNN is based on the amount of data provided in the training set. Because datasets have a limited number of images, it is possible to increase the amount of data provided to the CNN for training by perturbing the input data from a given training dataset. Various perturbations include mirroring the cropped portion, enlarging the area for cropping by some amount (for example 20%), adding noise to the image, resizing the bounding box to some fixed dimensions (for example 224×224), and varying the locations of the corners of the two dimensional bounding box. Additionally, by extending the data set through this perturbation method, a smaller training data set can be used, thereby requiring less memory storage space on a computer.

Figure 4:
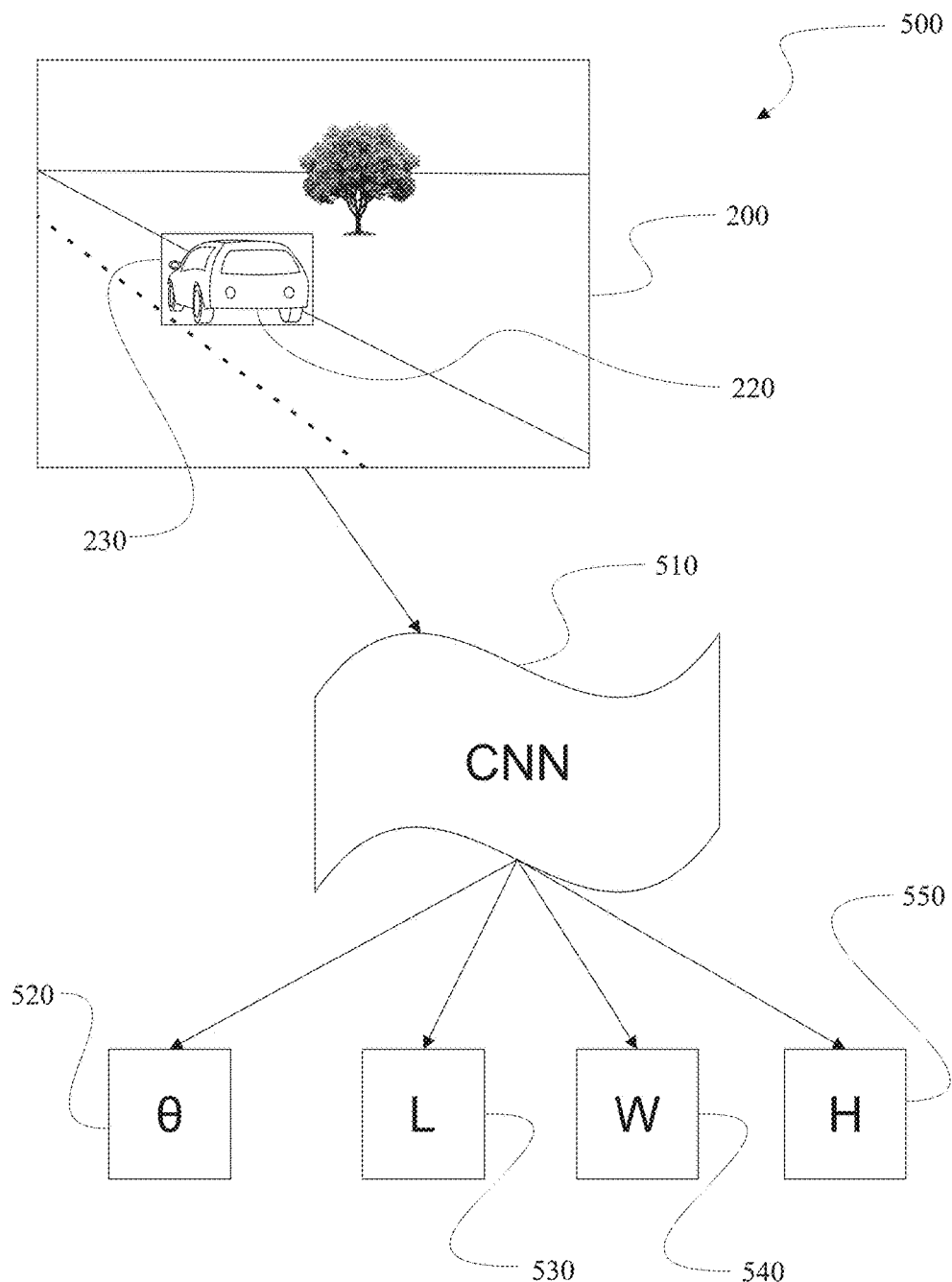
FIG. 4 represents a graphical representation of an example process by which a two dimensional image is run through a convolution neural network to determine a yaw angle, a length, a width, and a height.

FIG. 4 illustrates a pictorial representation of a process 500 using the CNN. As above, an image 200 contains an object, here vehicle image 220, which is contained in a two dimensional bounding box 220. The crop of image 200 located within the two dimensional bounding box 230 is passed as input to the CNN 510. The CNN 510 outputs values for a yaw angle 520 (which is represented as confidences of bins and offset angles), a length 530, a width 540, and a height 550. As will be discussed in more detail below, the length 530, width 540, and height 550 output by the CNN 510 represent residuals, or offsets, from a mean length of each dimension over all objects in the training dataset. In one embodiment, the yaw angle 520 output from the CNN 510 is a single value. In an alternate embodiment the yaw angle 520 is output as a two dimensional vector in order to eliminate any angular ambiguities such that normalization of the vector yields the cosine and sine of the yaw angle, as shown below:

$$\frac{1}{\sqrt{\alpha^2+\beta^2}}\begin{bmatrix}\alpha\\\beta\end{bmatrix}=\begin{bmatrix}\cos(\theta)\\\sin(\theta)\end{bmatrix}.$$

Loss functions are used to adjust internal parameters of the CNN during training. The loss functions are functions of the expected output (or ground truth) values for the dataset and values output by the CNN. Information contained in loss functions is sent through the CNN as back propagations to adjust internal parameters, tuning it to provide valid outputs. All else being equal, the more data that is used to train a CNN, the more reliable the CNN will be.

In one embodiment, the softmax function is used as a loss function to train the bin confidence level branch and is denoted as $L_{conf}$. In one embodiment, a loss function for the yaw offset angle is the average Euclidian distance for all the bins that cover a ground truth angle, as defined by the following equation:

$$L_{loc}=\frac{1}{n}\sum\sqrt{(\cos\theta^*-\cos(c_b+\theta_b))^2+(\sin\theta^*-\sin(c_b+\theta_b))^2},$$

where $\theta^*$ is the ground truth yaw angle, $c_b$ is the center angle for the bin, and $\theta_b$ is the offset angle within the bin.

For those back propagations in the CNN which depend on both the bin confidence and the yaw offset, it is possible to construct a residual which is the sum of both the bin confidence loss function and the yaw offset angle loss function. This summed residual is used to train the CNN for the overall yaw angle, as defined below:

$$L = L_{conf} + w \times L_{loc}$$

Here, a parameter, w, allows for weighting between determining the correct bin and determining the correct offset yaw angle. The parameter w can be tuned by sweeping over possible values based on a number of bins, a number of images in the dataset, or the like.

The training loss for estimating dimensions is defined as:

$$L_{dim} = \frac{1}{n} \sum_{i=1,2,3} (d_i^* - \mu_i - r_i)^2,$$

where $d_i^*$ is the ground truth of a dimension, $r_i$ is an estimated residual from the CNN for each dimension, and $\mu_i$ is the mean length of each dimension, i, for all objects in the training dataset.

Figure 5:
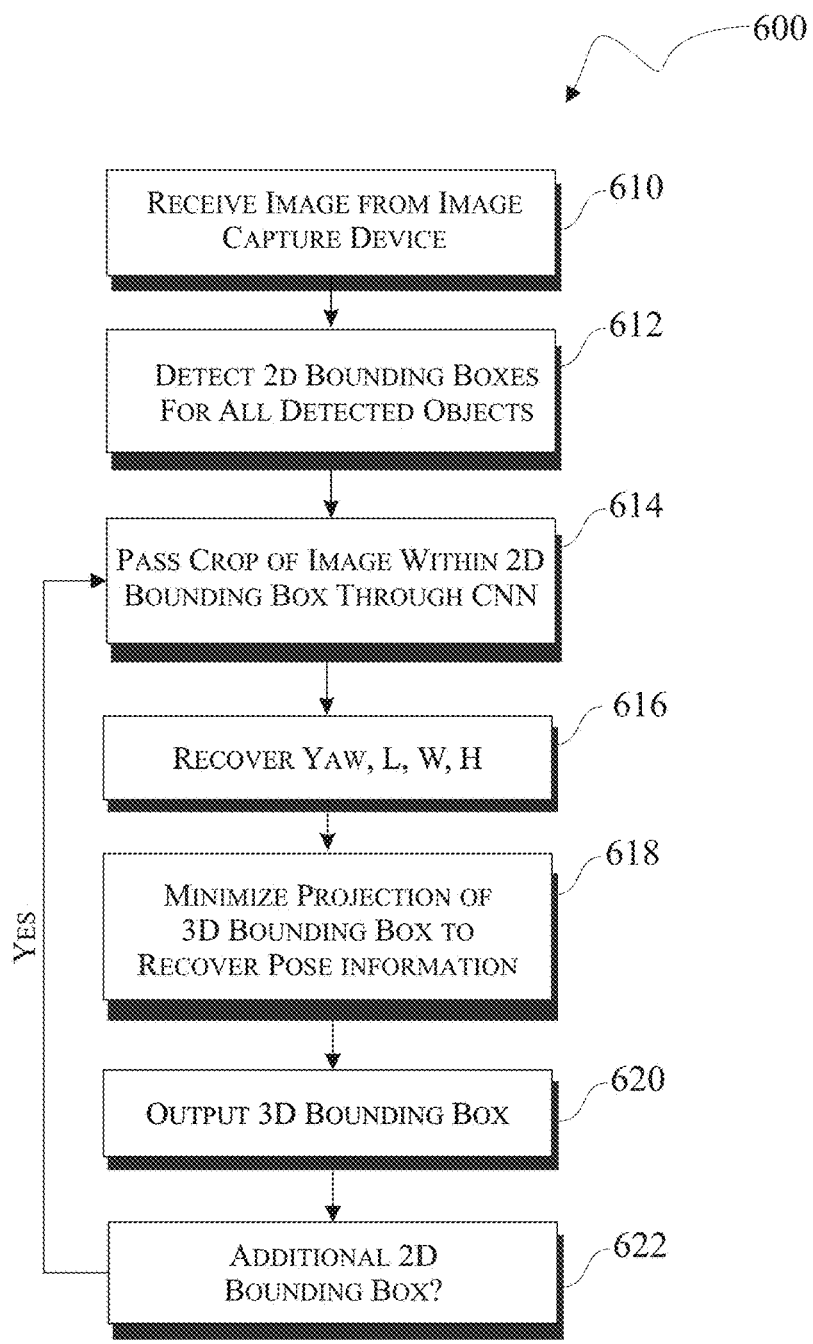
FIG. 5 illustrates a flow chart depicting an example method for determining a three dimensional bounding box from a two dimensional image.

FIG. 5 depicts a flow chart of an example three dimensional bounding box estimation process 600. Block 610 represents reception of an image, such as image 200, from an image capture device, such as image capture device 310. At block 612, a two dimensional bounding box is determined for each object detected in the image. The detection of objects and creation of two dimensional bounding boxes can be performed by any number of known algorithms, for example using rotating calipers. At block 614, a crop of the image located within the two dimensional bounding box is provided as input to a trained convolution neural network. At block 616, the trained convolution neural network outputs a yaw angle, length, width, and height for the object located in the two dimensional bounding box.

At block 618, an orientation and a position for the three dimensional bounding box is calculated based on the yaw angle, length, width, and height calculated in block 616. First, a rotation matrix, $\hat{R}$, is calculated using the yaw angle. In one embodiment, the three dimensional bounding box is assumed to have no roll or pitch, such that the rotation matrix is defined as:

$$\hat{R} = \begin{bmatrix} \cos\theta & -\sin\theta & 0 \\ \sin\theta & \cos\theta & 0 \\ 0 & 0 & 1 \end{bmatrix}$$

In other embodiments, the three dimensional bounding box may have a roll and/or a pitch, as output from the CNN. A translation vector, $\vec{t}$, is then determined by minimizing a projection error. The projection error is defined as a distance between edges of the three dimensional bounding box as projected into the image and the edges of the two dimensional bounding box. A pixel coordinate for points along the three dimensional bounding box edge is calculated as:

$$\begin{bmatrix} u' \\ v' \end{bmatrix} = P \begin{bmatrix} \hat{R} & \vec{t} \\ 0 & 1 \end{bmatrix} \begin{bmatrix} x \\ y \\ z \\ 1 \end{bmatrix}$$

Here, P represents the projection operator, which incorporates the camera calibration matrix, K. Further, by constraining the object to be in front of the camera (i.e. $t_z > 0$), the number of possible solutions is reduced.

In one embodiment, the projection error is minimized by locating the three dimensional bounding box (at the calculated orientation) along the center ray. The translation vector of the three dimensional bounding box can be swept from a center of the image capture device along the center ray in incremental steps until the projection error is minimized. The translation which results in the lowest projection error is associated with the correct translation vector. In some embodiments, in a final refinement step, the full translation vector is determined by performing a gradient descent of the projection error with respect to the translation vector.

In another embodiment, a set, or subset, of all possible mappings of the three dimensional bounding box to the two dimensional bounding box is created. As an example, one possible mapping is where a top back edge of the three dimensional bounding box corresponds to a top edge of the two dimensional bounding box, a back left edge of the three dimensional bounding box corresponds to a left edge edge of the two dimensional bounding box, a front right edge of the three dimensional bounding box corresponds to a right edge edge of the two dimensional bounding box and a front bottom edge of the three dimensional bounding box corresponds to a bottom edge of the two dimensional bounding box. A translation of the three dimensional bounding box is then recovered by unprojecting the corresponding edges within a mapping. The mapping which minimizes the projection error is chosen as a correct translation for the three dimensional bounding box. In those solutions where there are multiple solutions, only those solutions which are physically possible are considered. In some embodiments, 64 or fewer mappings are needed to solve for the translation.

Because the position and orientation are computed relative to the image capture device, various transformations may be applied to convert the position and orientation into a global coordinate system and/or a local coordinate system.

Relative to a center of the three dimensional bounding box, edges of the bounding box are defined as the lines between the following points:

$$\begin{bmatrix} \pm L/2 \\ W/2 \\ H/2 \end{bmatrix}, \begin{bmatrix} \pm L/2 \\ -W/2 \\ H/2 \end{bmatrix}, \begin{bmatrix} \pm L/2 \\ W/2 \\ -H/2 \end{bmatrix}, \text{ and } \begin{bmatrix} \pm L/2 \\ -W/2 \\ -H/2 \end{bmatrix}.$$

Additionally, if depth information is also available from the image capture device, the depth information may be used to aid determination of the position and orientation of the three dimensional bounding box.

At block 620, orientation, position, and dimensions of the three dimensional bounding box are output. In some examples, the three dimensional bounding box may be presented to a user graphically. Additionally, or alternatively, the orientation, position, and dimensions of the three dimensional bounding box may be transmitted to a system of a vehicle, such as a manually operated vehicle, autonomous or semi-autonomous vehicle, drone, or otherwise, for navigation, visualization of surroundings, obstacle detection, planning, and collision avoidance.

At block 622, the process 600 determines if there are any additional two dimensional bounding boxes which have not been processed. If any additional two dimensional bounding boxes remain, the process 600 returns block 614 to estimate three dimensional bounding boxes for each additional two dimensional bounding box in the input image.

CNN Architecture

In general, CNNs comprise multiple layers. Depending on the problem to be solved, differing layers and connections between layers can be used. The architecture of the CNN refers to which layers are used and how they are connected. As will be discussed in detail below, a CNN which has been trained can form the basis of another CNN. While there are many possible architectures to extract three dimensional bounding box estimates from input images, one example will be discussed in detail below. Despite the possibility of other architectures, the particular architecture of the embodiment described below is selected to have the same performance as other layers, though using fewer parameters, and results in less over-fitting. In any embodiment, the layers in the architecture can be selected based on the training data set used, the complexity of the objects, and the like.

Figure 6:
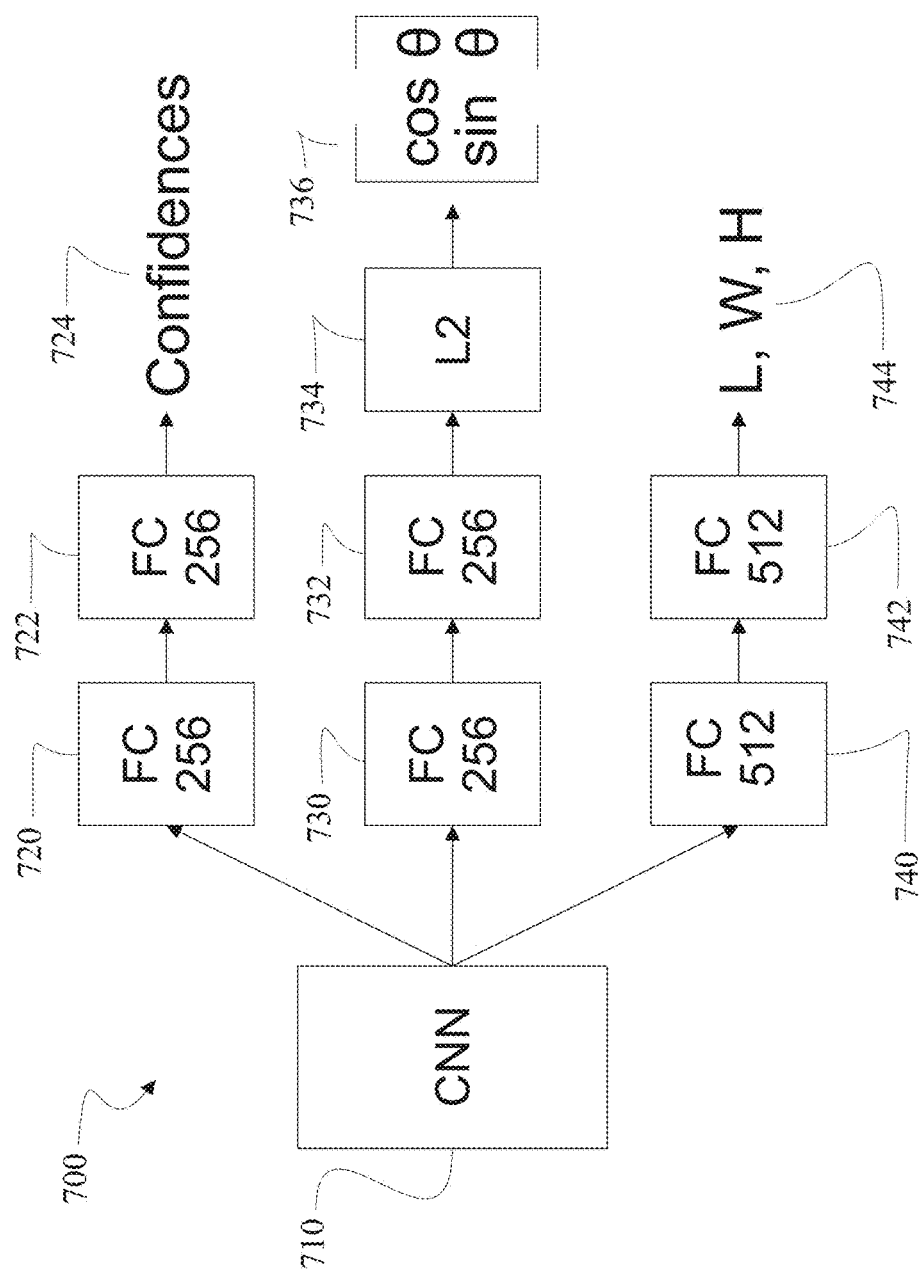
FIG. 6 depicts an example convolutional neural network architecture for determining a yaw angle and dimensions for a three dimensional bounding box from a two dimensional image.

FIG. 6 illustrates an embodiment of a CNN architecture 700 for recovering yaw angle and dimensions for a three dimensional bounding box from two dimensional images. As illustrated in FIG. 6, a previously trained CNN 710 can be used as a basis for more complex architectures. In one embodiment, one such previously trained CNN 710 is a Visual Geometry Group CNN, though other previously trained CNNs are contemplated. In order to obtain a confidence level for each bin, output from the CNN 710 is passed through a first fully connected layer 720 and a second fully connected layer 722, both of which are configured to output a 256 dimensional vector. The output of second fully connected layer 722 yields a confidence level for each bin 724.

To determine an offset yaw angle 736, output from the CNN 710 is passed through a third fully connected layer 730 and then a fourth fully connected layer 732, both of which configured to output a 256 dimensional vector. Output of the fourth fully connected layer 732 is then passed through a L2 filter 734 such that output of the L2 filter 734 is a sine and cosine of the offset yaw angle 736 for every bin.

Dimensions of the three dimensional bounding box are estimated by passing the output of the CNN 710 through a fifth fully connected layer 740 and a sixth fully connected layer 742, both of which configured to output a 512 dimensional vector. The output of the sixth fully connected layer 742 being the residuals 744 for a dimension.

Improved Cropping

In order to improve determination of a two dimensional bounding box from an image, it is also possible to use a CNN. This two dimensional bounding box determination may be performed instead of, or in addition to, estimation of three dimensional bounding boxes from the image. In one embodiment, area of the two dimensional bounding box is increased. For exemplary purposes, the corners are extended from the center of the two dimensional bounding so that the area of a new two dimensional bounding box is a fixed percentage greater than the area of the original two dimensional bounding box. A crop of the image within the new two dimensional bounding box is then input into a CNN trained to detect bounding boxes.

Simultaneous Solutions

Though the three dimensional bounding box for every detected object in an image may be calculated sequentially as illustrated above (i.e. evaluating each object in an image individually), the process defined above can be run simultaneously. Several such simultaneous detection mechanisms contemplated are the use of Fast-R CNN, Faster-R CNN and SSD Multibox (Single Shot Detector Multibox). Through these mechanisms, two and three dimensional bounding boxes are detected simultaneously for all objects in an image. In one embodiment, as in the embodiments illustrated above, additional layers may be inserted into architectures of the simultaneous detection mechanisms to output a yaw angle, and/or a roll angle, and/or a pitch angle, as well as dimensions for every object detected in the image. In those embodiments where additional layers are added to a Fast-R CNN or a Faster-R CNN, angles and dimensions may be estimated either at an object detection stage or at a classification stage.

The Computerized System

Figure 7:
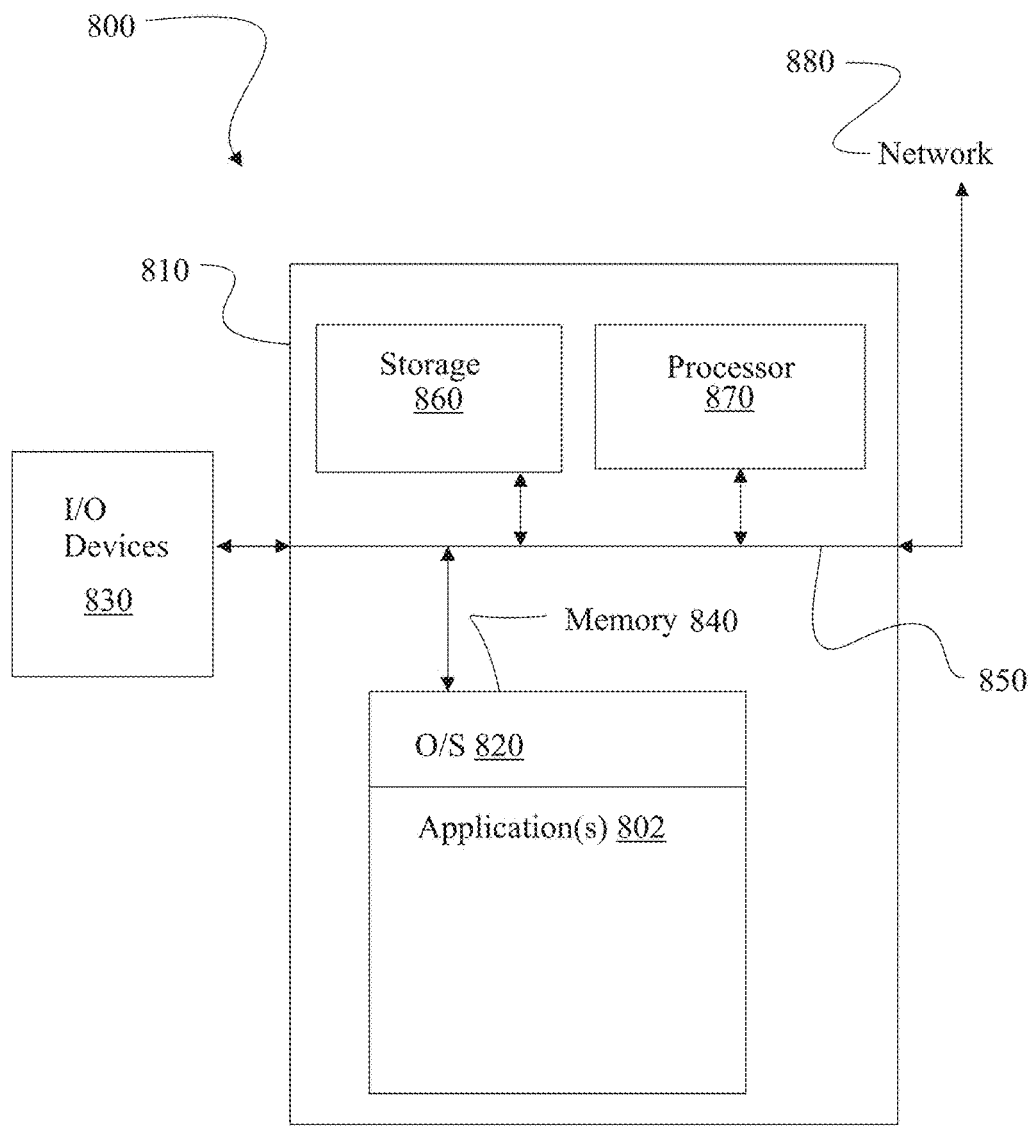
FIG. 7 depicts an example computerized system usable to determine a three dimensional bounding box from a two dimensional image.

Turning briefly to FIG. 7, a computerized system 800 is depicted as an example computerized system on which the invention may be implemented in whole or in part. The computerized system 800 depicts a computer system 810 that comprises a storage 860, a processor 870, a memory 840, and an operating system 820. The storage 860, processor 870, memory 840, and operating system 820 may be communicatively coupled over a communication infrastructure 850. Optionally, the computer system 810 may interact with a user, or environment, via I/O devices 830, as well as one or more other computing devices over a network 880, via the communication infrastructure 850. The operating system 820 may interact with other components to control one or more applications 802.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An example computerized system for implementing the invention is illustrated in FIG. 7. A processor or computer system can be configured to particularly perform some or all of the methods described herein. In some embodiments, the methods can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™ SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the computing device may be operatively coupled to an automotive system. Such automotive system may be either manually operated, semi-autonomous, or fully autonomous. In such an embodiment, input and output devices may include an image capture device, and controllers, microcontrollers, or other processors to control automotive functions such as, but not limited to, acceleration, braking, and steering. Further, communication infrastructure in such embodiments may also include a Controller Area Network (CAN) bus.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™ JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What we claim is:

1. A system for estimating a three dimensional bounding box from a two dimensional image, the system including a non-transitory computer readable medium comprising instructions that, when executed by one or more processors, cause the system to:
receive an image captured from an image capture device;
detect an object in the image;
create a two dimensional bounding box around the object;
crop the image using the two dimensional bounding box to form a cropped image;
input the cropped image into a convolutional neural network; and
receive, based at least in part on the cropped image, from the convolutional neural network:
an orientation of a three dimensional bounding box associated with the object, wherein the orientation is indicative of a direction of motion associated with the object; and
dimensions of the three dimensional bounding box, wherein the dimensions comprise a length, a width, and a height;
wherein the convolutional neural network comprises:
a bin confidence branch configured to indicate a confidence value representing a coarse orientation of the three dimensional bounding box; and
an orientation offset branch configured to indicate an orientation offset with respect to the coarse orientation output by the bin confidence branch.

2. The system of claim 1, wherein the orientation of the three dimensional bounding box is based at least in part on the coarse orientation and the orientation offset, the orientation represented as an angle between a center ray and a direction of the three dimensional bounding box, and further wherein the center ray is a ray that passes from a center of the image capture device through a center pixel of the two dimensional bounding box.

3. The system of claim 1, wherein the convolutional neural network is trained based at least in part on training data comprising an input two dimensional bounding box and an associated ground truth three dimensional bounding box.

4. The system of claim 1, wherein the convolutional neural network is a visual geometry group convolutional neural network.

5. The system of claim 1, wherein:
the bin confidence branch outputs a plurality of confidences associated with a plurality of bins, each bin representing a discrete range of possible orientations of the three dimensional bounding box and having a center angle;
the bin confidence branch is trained using a bin confidence loss function; and
the coarse orientation is based at least in part on a bin having a highest confidence.

6. The system of claim 1, wherein:
the orientation offset branch is trained using an orientation offset loss function.

7. The system of claim 1, wherein:
output of a dimension estimation branch comprises one or more of a length residual, a height residual, or a width residual; and
the dimension estimation branch is trained using a dimension estimation loss function.

8. The system of claim 5, wherein the bin confidence loss function is a softmax.

9. The system of claim 6, wherein the orientation offset loss function is an average Euclidian distance between a ground truth orientation and an estimated orientation, the estimated orientation representing a sum of a center angle of a bin having a highest confidence level and output of the orientation offset branch.

10. The system of claim 7, wherein the dimension estimation loss function is an average of a square of a difference between a ground truth length measurement in each of a length, a width, and a height dimension, a mean length measurement for each of a length, a width, and a height dimension of all objects in a training dataset, and output of the dimension estimation branch.

11. The system of claim 1, wherein a position of the three dimensional bounding box is calculated by minimizing a difference between a projection of the three dimensional bounding box into the image and the two dimensional bounding box.

12. The system of claim 1, wherein additional data for training the convolutional neural network is generated from an existing dataset by applying a transformation to an image of the existing dataset.

13. The system of claim 12, wherein the transformation comprises at least one of:
mirroring the image;
adding noise to the image;
resizing the cropped image; or
resizing the two dimensional bounding box.

14. A computer implemented method for estimating a three dimensional bounding box of an object in a two dimensional image, comprising:
receiving an image from an image capture device;
detecting an object represented in the image;
determining a two dimensional bounding box around the object;
cropping the image using the two dimensional bounding box to form a cropped image;
inputting the cropped image into a machine learning algorithm;
receiving from the machine learning algorithm:
an orientation of a three dimensional bounding box associated with the object, wherein the orientation is indicative of a direction of motion associated with the object; and
dimensions of the three dimensional bounding box;
wherein the machine learning algorithm comprises:
a bin confidence branch configured to indicate a confidence value representing a coarse orientation of the three dimensional bounding box; and
an orientation offset branch configured to indicate an orientation offset with respect to the coarse orientation output by the bin confidence branch; and
estimating a position of the three dimensional bounding box by projecting the three dimensional bounding box into the image.

15. The computer implemented method of claim 14, wherein the orientation of the three dimensional bounding box is represented by an angle between a center ray and a direction of the three dimensional bounding box, and further wherein the center ray is a ray that passes from a center of the image capture device through a center pixel of the two dimensional bounding box.

16. The computer implemented method of claim 15, wherein the machine learning algorithm is a convolutional neural network comprising a trained convolutional neural network, the trained convolutional neural network having an output, and further wherein:
   a first copy of the output is input into the bin confidence branch, the bin confidence branch being trained using a bin confidence loss function;
   a second copy of the output is input to the orientation offset branch, the orientation offset branch being trained using an orientation offset loss function; and
   a third copy of the output is input into a dimension estimation branch, wherein output of the dimension estimation branch are a length residual, a height residual, and a width residual, the dimension estimation branch being trained using a dimension estimation loss function.

17. The computer implemented method of claim 16, wherein the bin confidence loss function is a softmax function and the orientation offset loss function is an average Euclidian distance between a ground truth orientation and an estimated orientation, the estimated orientation representing a sum of a center angle of a bin having a highest confidence level and output of the orientation offset branch.

18. The computer implemented method of claim 16, wherein the dimension estimation loss function is an average of a square of a difference between a ground truth length measurement in each of a length, a width, and a height dimension, a mean length measurement for each of a length, a width, and a height dimension of all objects in a training dataset, and output of the dimension estimation branch.

19. The computer implemented method of claim 14, wherein estimating the position of the three dimensional bounding box comprises minimizing a difference between a projection of the three dimensional bounding box, into the image, and the two dimensional bounding box.

20. A system for estimating a three dimensional bounding box from a two dimensional image including a non-transitory computer readable medium comprising instructions that, when executed by one or more processors, cause the system to:
   receive an image from an image capture device, the image representing an object;
   pass at least a portion of the image into a machine learning algorithm;
   receive from the machine learning algorithm:
      an orientation of a three dimensional bounding box associated with the object, wherein the orientation is indicative of a direction that the object is capable of moving; and
      dimensions of the three dimensional bounding box;
   wherein the machine learning algorithm comprises:
      at least one of a Fast-R, a Convolutional Neural Network, a Faster-R Convolutional Neural Network, or a Single Shot Detector Multibox;
      a bin confidence branch configured to indicate a confidence value representing a coarse orientation of the three dimensional bounding box; and
      an orientation offset branch configured to indicate an orientation offset with respect to the coarse orientation output by the bin confidence branch.

* * * * *